(12) United States Patent
Tricoukes et al.

(10) Patent No.: US 8,848,940 B2
(45) Date of Patent: Sep. 30, 2014

(54) MODULAR HEADSET COMPUTER

(75) Inventors: Nicole D. Tricoukes, Seaford, NY (US);
Juliet T. Chon, Worcester, MA (US);
Ian R. Jenkins, Stony Brook, NY (US);
Mitchell Maiman, Ronkonkoma, NY (US); Jorg Schlieffers, Abingdon (GB)

(73) Assignee: Symbol Technologies, Inc., Holtsville, NY (US)

( * ) Notice: Subject to any disclaimer, the term of this patent is extended or adjusted under 35 U.S.C. 154(b) by 393 days.

(21) Appl. No.: 13/267,067

(22) Filed: Oct. 6, 2011

(65) Prior Publication Data

US 2013/0089214 A1   Apr. 11, 2013

(51) Int. Cl.
*H04R 1/10* (2006.01)
*G06F 1/16* (2006.01)
*G09G 5/00* (2006.01)

(52) U.S. Cl.
CPC .................................. *G06F 1/163* (2013.01)
USPC .................................................. 381/74; 345/8

(58) Field of Classification Search
CPC ......... G06F 3/012; G06F 1/163; G06F 3/011; G10L 2015/223; G10L 2015/228; H04N 21/43637
USPC ............... 381/74, 374, 379; 345/7, 8; 224/81
See application file for complete search history.

(56) References Cited

U.S. PATENT DOCUMENTS

| | | | |
|---|---|---|---|
| 3,971,901 A | 7/1976 | Foley | |
| 5,781,913 A | 7/1998 | Felsenstein et al. | |
| 2008/0144854 A1* | 6/2008 | Abreu | 381/74 |
| 2012/0068914 A1* | 3/2012 | Jacobsen et al. | 345/8 |
| 2012/0287284 A1* | 11/2012 | Jacobsen et al. | 348/158 |

FOREIGN PATENT DOCUMENTS

| | | |
|---|---|---|
| CA | 2218812 A1 | 10/1997 |
| EP | 1696363 A2 | 8/2006 |

OTHER PUBLICATIONS

International Search Report and Written Opinion dated Jan. 31, 2013 in counterpart application PCT/US2012/058419.

\* cited by examiner

*Primary Examiner* — Vivian Chin
*Assistant Examiner* — Ammar Hamid

(57) ABSTRACT

A headset is described. The headset includes a headset insert worn on a head of a user. The headset insert includes a first connector having a first mechanical coupler. The first connector is configured to mate in at least two different orientations with a second connector having a second mechanical coupler. A frame includes the second connector that mates with the first connector. The frame is adapted to receive the headset insert in at least two different orientations.

22 Claims, 8 Drawing Sheets

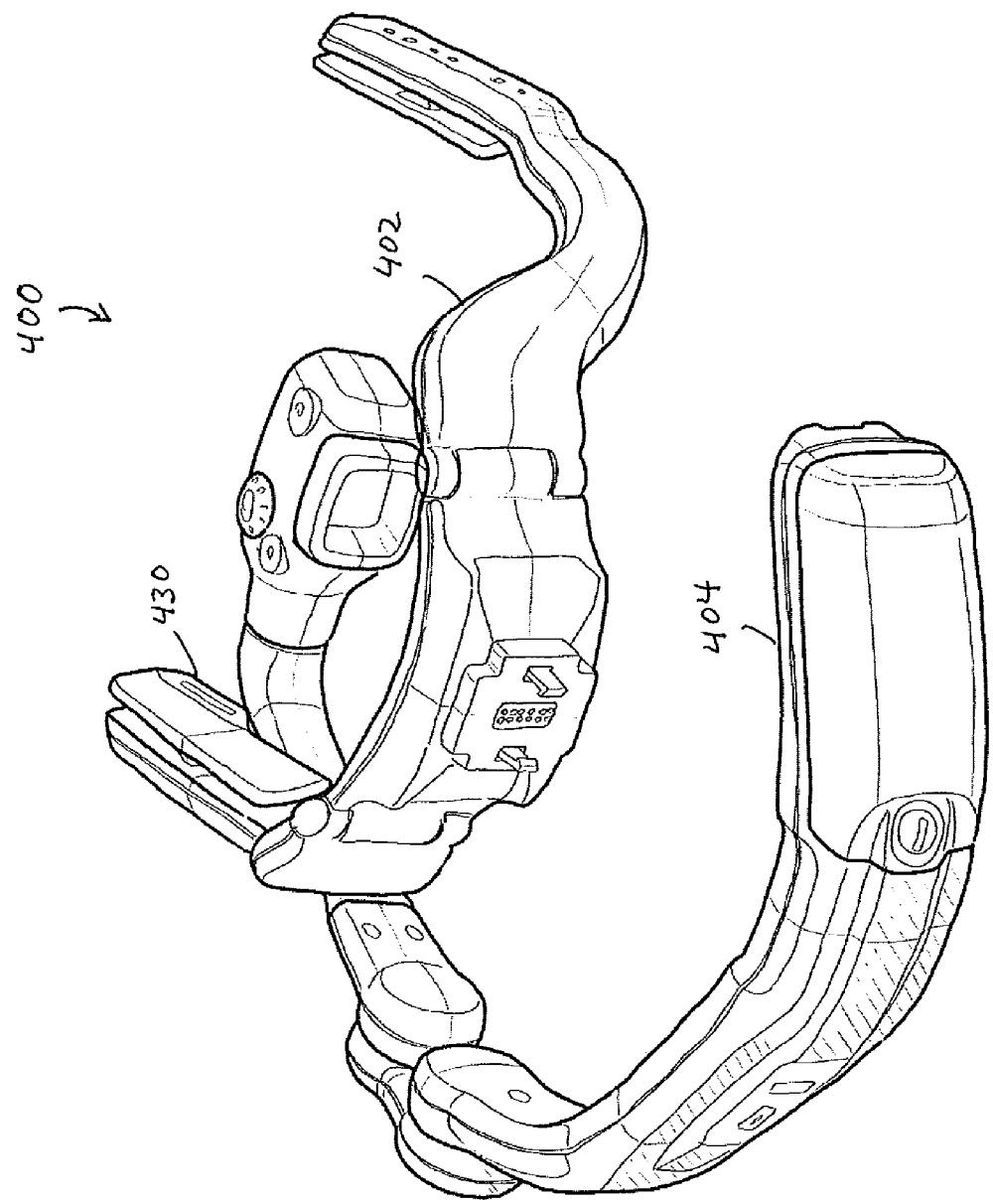

MODULAR HEADSET COMPUTER

TECHNICAL FIELD

The invention relates generally to a headset computer having a modular construction.

BACKGROUND

Headsets including booms are generally used for hands-free communication. The boom can include a microphone and the frame of the headset can include a speaker. The headset can include a single speaker or a pair of speakers (i.e., one for each ear). The boom is generally rotatable relative to the frame to allow the user to wear the headset in either a left or right configuration. For example, the boom can typically be positioned on either the left or right side of a user's face.

SUMMARY

In one aspect, the invention is embodied in a headset computer. The headset computer includes a headset insert worn on a head of a user. The headset insert includes a first connector having a first mechanical coupler. The first connector is configured to mate in at least two different orientations with a second connector having a second mechanical coupler. A frame includes a second connector that mates with the first connector. The frame is adapted to receive the headset insert in the at least two different orientations.

In one embodiment, the frame also includes a memory for storing a software application and a processor for executing the software application. The frame can also include a wireless radio for connection with a wireless network. In one embodiment, the headset insert includes a speaker. The headset insert can also include a cushion.

In one embodiment, the process of mating the first and second mechanical couplers physically secures the headset insert to the frame. In one embodiment, the process of mating the first and second connectors electrically connects a circuit in the headset insert to a circuit in the frame. In one embodiment, the headset insert includes a mechanical release for separating the second mechanical coupler from the first mechanical coupler.

The headset insert can be configured to fit a plurality of heads having different sizes. In one embodiment, the headset insert further includes a plurality of mechanical attachment features for attaching a head-strap. The frame can include a boom for supporting a peripheral. The peripheral can be a display, a microphone, or a motion sensor. The display can be a micro-display.

In another aspect, the invention is embodied in a headset computer. The headset includes a headset insert worn on a head of a user. The headset insert is configured to fit a plurality of heads having different sizes. The headset insert includes a speaker and a first connector having electrical contacts and mechanical coupling features. The first connector is configured to mate in at least two different orientations with a second connector. A frame includes the second connector. The second connector mates with the first connector in at least two different orientations. The frame includes a memory for storing a software application and a processor for executing the software application. A boom is coupled to the frame for supporting a peripheral. The peripheral includes a user interface to the software application.

In one embodiment, the peripheral includes a display, a microphone and/or a motion sensor. The display can include a micro-display. The frame can include a wireless radio for connection with a wireless network. The headset insert can also include a cushion.

The headset can also include a mechanical release for separating the second connector from the first connector. In one embodiment, the process of mating the first and second connectors electrically connects a circuit in the headset insert to a circuit in the frame.

In one embodiment, the headset insert is configured to fit a plurality of heads having different sizes. The headset insert can also include a plurality of mechanical attachment features for attaching a head-strap.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments.

In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Figure 1:
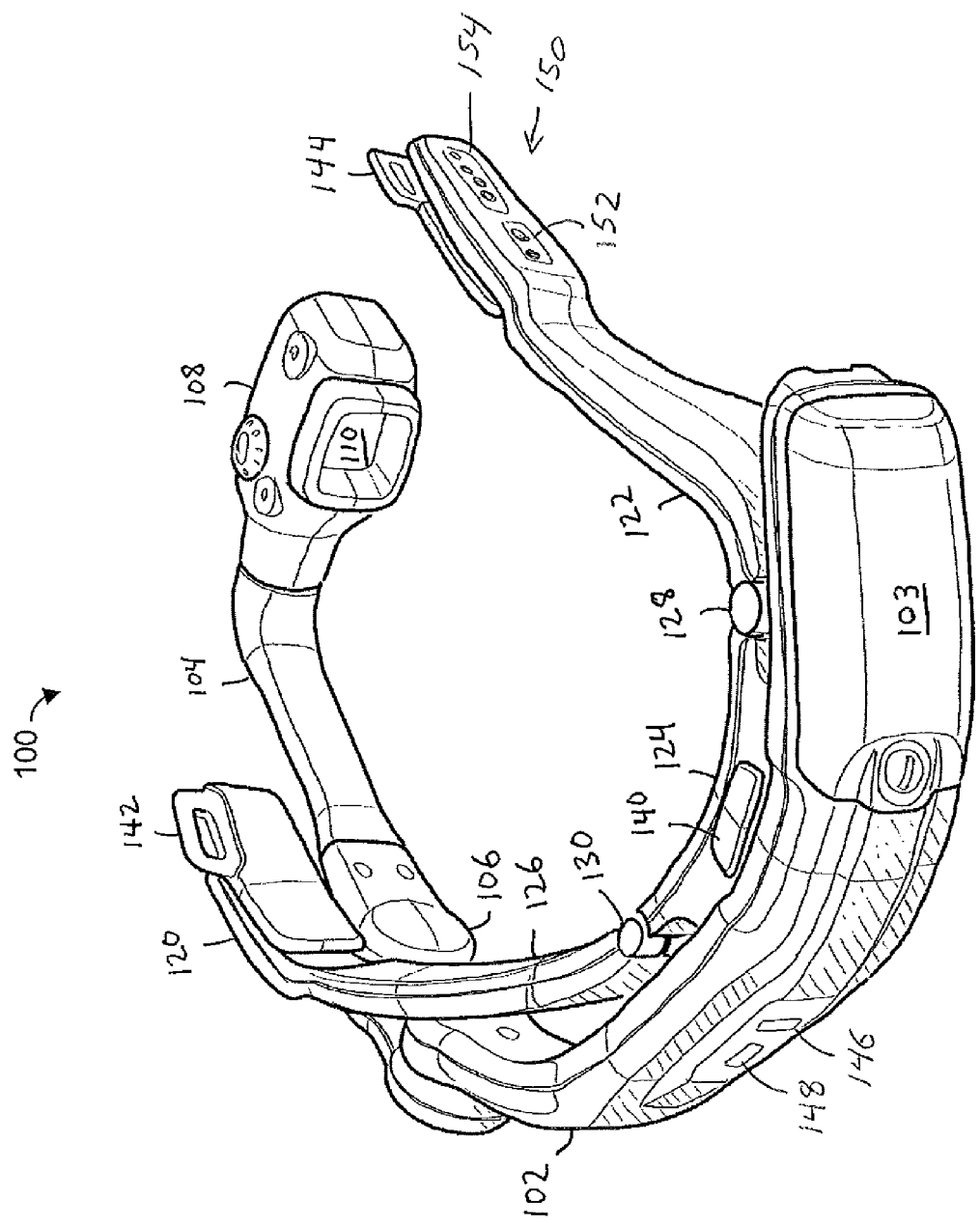

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

FIG. 1 is a perspective view of a modular headset computer according to one embodiment of the invention.

Figure 2:
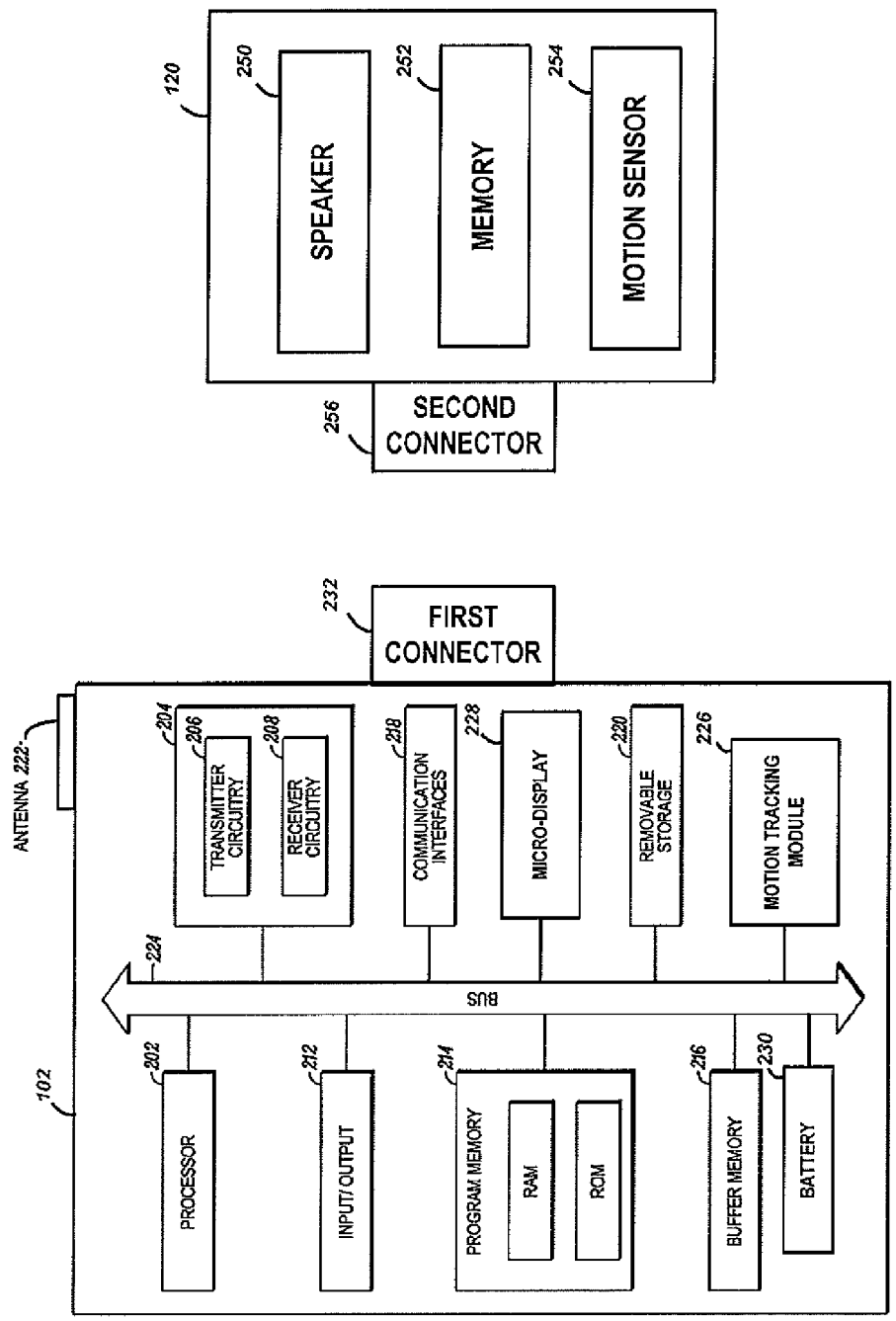

FIG. 2 is a block diagram illustrating the electronic components of the headset of FIG. 1 according to the invention.

Figure 3A:
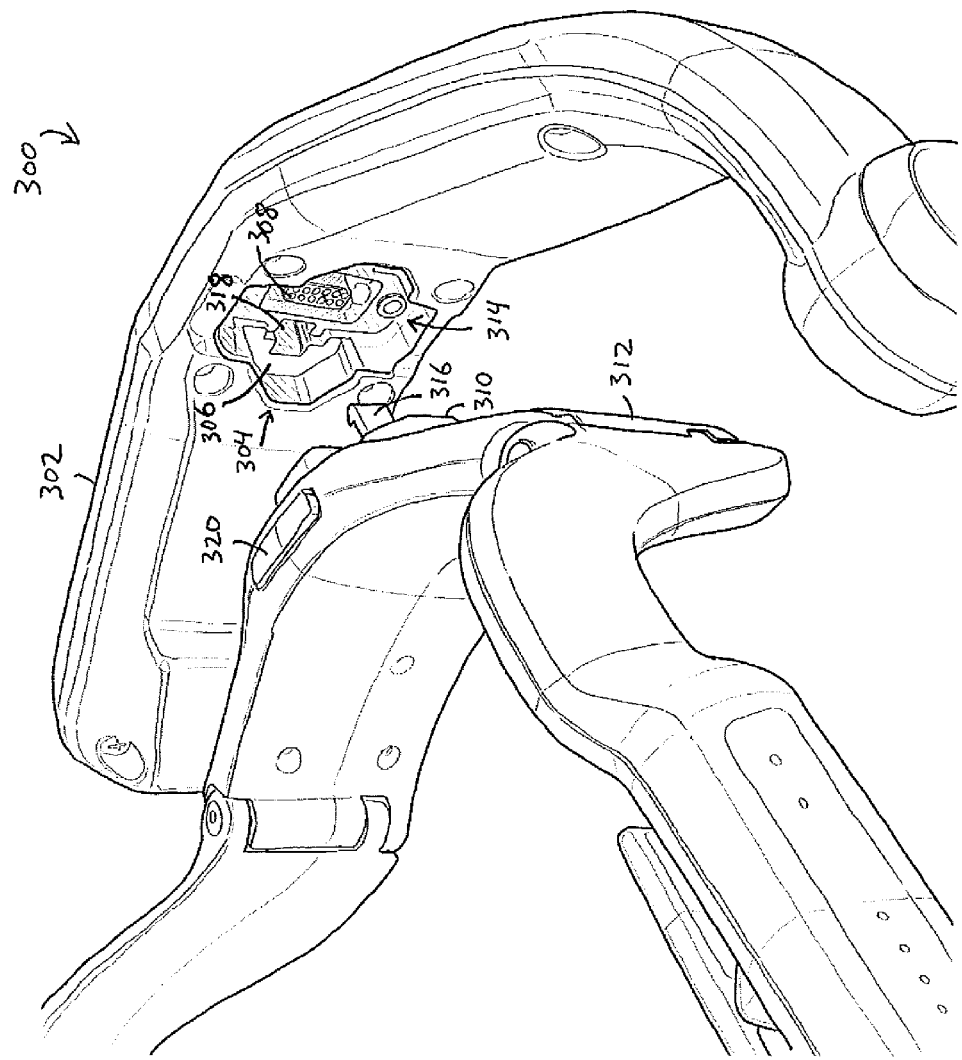

FIG. 3A illustrates a perspective view of a frame of a headset including a first connector according to one embodiment of the invention.

Figure 3B:
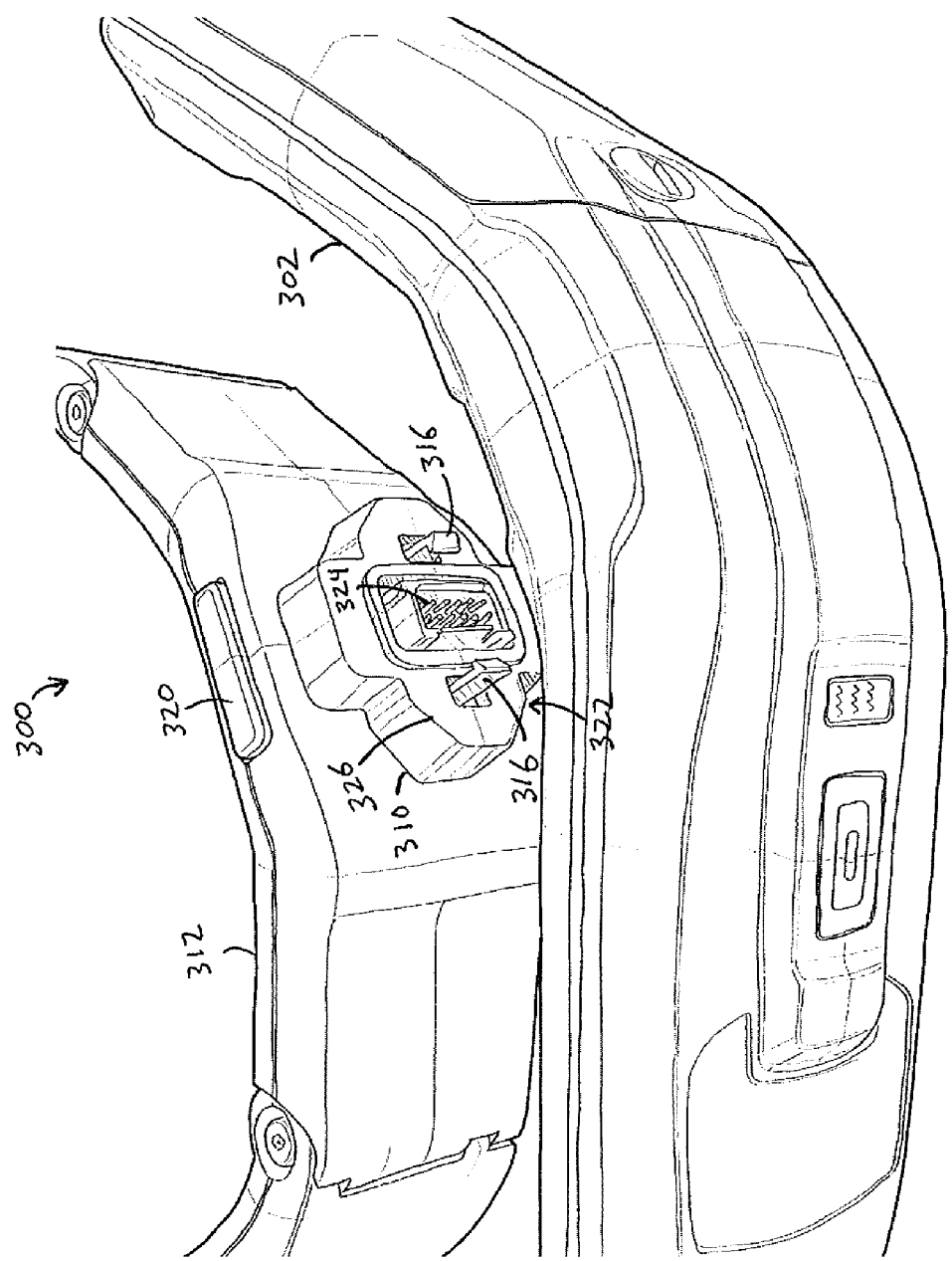

FIG. 3B illustrates a perspective view of the headset insert including the second connector according to one embodiment of the invention.

FIG. 4A-FIG. 4D are perspective views of a modular headset computer according to one embodiment of the invention.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to conventional headsets, need not, and are not, described in detail herein.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to headset computers. In one exemplary embodiment, a modular headset computer is configurable to be worn in different orientations on a user's head.

In one embodiment, the headset includes a headset insert worn on a head of a user. The headset insert is configurable to fit a plurality of different size heads. The headset insert can include a speaker and an optional memory. The headset insert can also include a first connector having electrical contacts and mechanical coupling features. The first connector is configured to mate in two different orientations with a second connector included on a frame that mates with the headset insert.

The frame includes the second connector that mates with the first connector in the two different orientations. The frame can also include a memory for storing a software application and a processor for executing the software application. In one embodiment, the frame includes a boom for supporting a peripheral. The peripheral can include a user interface to the software application.

FIG. 1 is a perspective view of a modular headset computer 100 according to one embodiment of the invention. The headset 100 includes a frame 102. The frame 102 can house electronic components, including internal communication components and circuitry as further described with relation to FIG. 2 to enable the headset 100 to operate and to communicate wirelessly with other devices. The frame 102 also includes a portable power supply 103, such as a battery for powering the headset 100.

A boom 104 is mechanically coupled to the frame 102 through a mechanical coupling 106. The mechanical coupling 106 can be a rotary coupling, a linear coupling or any other suitable coupling. In practice, the boom 104 can be mechanically coupled to the frame 102 through any suitable technique. In one embodiment, the boom 104 is flexible. The boom 104 supports an electronic device 108. The electronic device 108 can be a display module 110. In other embodiments, the electronic device 108 can be a data capture device, a camera, or a microphone, for example. In practice, any suitable electronic device can be supported by the boom 104. The display 110 is coupled to one end of the boom 104. The display 110 can be a micro-display that displays information to an eye of a user. Alternatively, the headset 100 can include two displays (not shown). The two displays can be positioned on the boom 104 or each display can be positioned on a separate boom. The boom 104 can also include a microphone (not shown) for receiving voice input from the user.

The frame 102 of the headset 100 can also include one or more motion tracking components (not shown), such as a digital compass, a gyroscope, an accelerometer or a global positioning system (GPS) module, which can track the location of the headset 100. In some embodiments, the headset 100 includes more or less than all of the I/O devices shown in FIG. 1.

The headset 100 can also include a headset insert 120 mechanically and electrically coupled to the frame 102. The headset insert 120 can include sections 122, 124, 126 attached by hinges 128, 130 adapted to fit different sized and shaped heads. The headset insert 120 can also include padding for cushioning each of the sections 122, 124, 126. In one embodiment, the headset insert 120 can be detached from the frame 102 by activating a mechanical release 140. The headset insert 120 can also include mechanical features 142, 144 for supporting a head strap (not shown).

In one embodiment, the headset insert 120 can include a speaker (not shown). The speaker can be positioned proximate to the user's ear when the headset insert 120 is positioned on the head of the user. The headset insert 120 can also include a memory (not shown) for storing data, such as user-defined settings, preferences and/or parameters. The memory is preferably a non-volatile memory. In one embodiment, the headset insert 120 can include a slot (not shown) for receiving a removable memory, such as a secure digital (SD) memory card.

The frame 102 can include a power/standby/resume control 146 for activating and deactivating the headset 100. A light emitting diode (LED) status indicator 148 is positioned proximate to the control 146 to provide status information to the user. Additionally, the headset insert 120 can include a user interface 150. The user interface 150 can include a power/standby/resume control 152. The user interface 150 can also include one or more light emitting diode (LED) status indicators 154. In practice, any suitable input/output interface can be used.

FIG. 2 is a block diagram 200 illustrating the electronic components of the headset 100 of FIG. 1 according to the invention. The headset 100 includes the frame 102 and the headset insert 120.

The frame 102 contains, among other components, a processor 202, a transceiver 204 including transmitter circuitry 206 and receiver circuitry 208, an antenna 222, I/O devices 212, such as a microphone, a program memory 214 for storing operating instructions that are executed by the processor 202, a buffer memory 216, one or more communication interfaces 218, an optional removable storage 220, and a motion tracking module 226 which can include one or more of a global positioning system (GPS), an electronic compass and/or a motion sensor.

The frame 102 can also include a boom 104 (FIG. 1) for supporting a micro-display 228. The frame 102 is preferably an integrated unit containing the elements depicted in FIG. 2, as well as any other element necessary for the headset 100 to function. In one embodiment, the electronic components are connected by a bus 224. The frame 102 includes a portable power supply 230, such as a battery. The frame 102 also includes a first connector 232. In one embodiment, the first connector 232 includes electrical contacts and a mechanical coupler.

The processor 202 can include one or more microprocessors, microcontrollers, DSPs, state machines, logic circuitry, or any other device or devices that process information based on operational or programming instructions. Such operational or programming instructions are preferably stored in the program memory 214. The program memory 214 can be an IC memory chip containing any form of random access memory (RAM) or read only memory (ROM), a floppy disk, a compact disk (CD) ROM, a hard disk drive, a digital video disk (DVD), a flash memory card or any other medium for storing digital information. Skilled artisans will recognize that when the processor 202 has one or more of its functions performed by a state machine or logic circuitry, the program memory 214 containing the corresponding operational instructions may be embedded within the state machine or logic circuitry. Operations performed by the processor 202 as well as the headset 100 are described in detail below.

The transmitter circuitry 206 and the receiver circuitry 208 enable the headset 100 to respectively transmit and receive communication signals. In this regard, the transmitter circuitry 206 and the receiver circuitry 208 include circuitry to enable wireless transmissions. The implementations of the transmitter circuitry 206 and the receiver circuitry 208 depend on the implementation of the headset 100 and the network with which it is to communicate. In one embodiment, the transmitter and receiver circuitry 206, 208 can be implemented as part of the communication device hardware and software architecture in accordance with known techniques. For example, the headset 100 can communicate through a cellular network such as a code division multiple access (CDMA) network or a global system for mobile communications (GSM) network. In one embodiment, the transmitter and receiver circuitry 206, 208 can communicate with a local area network (LAN).

One of ordinary skill in the art will recognize that most, if not all, of the functions of the transmitter or receiver circuitry 206, 208 can be implemented in a processor, such as the processor 202. However, the processor 202, the transmitter circuitry 206, and the receiver circuitry 208 have been partitioned herein to facilitate a better understanding of the functions of these elements. In one embodiment, the antenna 222 is a cellular antenna coupled to the transceiver 204. The antenna 222 can also be a LAN antenna or a Bluetooth antenna.

The buffer memory 216 may be any form of volatile memory, such as RAM, and is used for temporarily storing received information. The removable storage 220 can be a secure digital (SD) memory card, for example.

The motion tracking module 226 can be implemented as a stand-alone module within the headset 100. In one embodiment, the module can include a global positioning system (GPS) having a satellite receiver that communicates with global positioning satellites to provide a position of the headset 100. Global positioning systems use the technique of triangulation to determine the position of a GPS receiver on the surface of the Earth.

The program memory 214 can store instructions to be executed on the processor 202 and the processor 202 can instruct the micro-display 228 to display data. In general, the processor 202 of the headset 100 includes processing logic configured to carry out the functions, techniques, and processing tasks associated with the operation of the headset 100. Furthermore, the steps of a method or algorithm described in connection with the embodiments disclosed herein may be embodied directly in hardware, in firmware, in a software module executed by the processor 202, or any combination thereof. Any such software may be implemented as low level instructions (assembly code, machine code, etc.) or as higher-level interpreted or compiled software code (e.g., C, C++, Objective-C, Java, Python, etc.).

The headset insert 120 can include a speaker 250. The speaker 250 can be positioned proximate to a user's ear when the headset insert 120 is positioned on the user's head. In one embodiment, the headset insert 120 can include multiple speakers.

The headset insert 120 can also include a memory 252, such as a non-volatile memory for storing user preferences. Each user can program user-definable preferences into the memory 252 of the headset insert 120. The user preferences can include configuration settings for customizing the operation of the headset 100. For example, for hygienic purposes, each user can be issued a personal headset insert 120 having an appropriate size for each user's head. In another embodiment, multiple users can share a headset insert 120. Each user can carry a SD memory card containing the user's configuration file. Alternatively, multiple users can load their preference settings into the memory 252 of the headset insert 120 and select the appropriate personalized configuration file upon operating the headset 120.

In one embodiment, the headset inset 120 also includes a motion sensor 254, such as an accelerometer for measuring the motion of the headset insert 120. For example, the accelerometer can determine whether a user's head was subjected to an unsafe acceleration that could lead to a concussion.

The headset insert 120 includes a second connector 256 that is adapted to mate with the first connector 232 on the frame 102 in at least two different orientations. In one embodiment, the two orientations are one hundred and eighty (180) degrees rotated with respect to each other.

In one embodiment, the first connector 232 and the second connector 256 both include electrical contacts and a mechanical coupler. The electrical contacts from each of the first 232 and second connectors 256 are configured to mate with each other. For example, the contacts can be male/female, plugs/sockets, pogo pins/contact pads, or any other suitable electrical connector pair.

In one embodiment, the orientation of the first connector 232 relative to the second connector 256, and hence, the orientation of the headset insert 120 relative to the frame 102, is determined by the processor 202 based on which contacts from the first 232 and second connectors 256 are mated together. Alternatively, the motion tracking module 226 in the frame 102 can transmit data relating to the orientation of the frame 102 to the processor 202.

In operation, the headset insert 120 is mechanically and electrically coupled to the frame 102. The headset 100 is then positioned on a user's head. The headset insert 120 can include adjustable sections including padding or cushions to create a customizable fit on the user's head.

In an embodiment including the micro-display 228, a boom supporting the micro-display 228 is adjustable to position the micro-display 228 proximate to an eye of the user. The user can interact with the headset 100 by speaking into a microphone which can be located on the boom, on the frame 102, and/or on the headset insert 120 of the headset 100. Alternatively, the user can interact with the headset 100 through a Bluetooth or similar connection with an external device, such as a mobile computing device (not shown). In one embodiment, the headset 100 includes the motion tracking module 226 which tracks the movement of a user's head wearing the headset 100.

FIG. 3A illustrates a perspective view of a frame 302 of a headset 300 including a first connector 304 according to one embodiment of the invention. The first connector 304 includes mechanical features 306 and electrical contacts 308 which mate with corresponding mechanical features and electrical contacts (not shown) of a second connector 310 integrated with a headset insert 312 of the headset 300.

In one embodiment, the first connector 304 is designed with a recess 314. The recess 314 can have a shape which accepts a corresponding protrusion (not shown) from the second connector 310. The shapes of the recess 314 and corresponding protrusion are preferably symmetrical along the vertical and horizontal axes to allow the recess 314 to accept the protrusion in at least two different orientations.

The second connector 310 can also include a mechanical latch 316. The latch 316 engages with a locking feature 318 located in the recess of the first connector 304. The latch 316 is configured to physically secure the second connector 310 to the first connector 304, thereby securing the headset insert 312 to the frame 302. A mechanical release 320 is coupled to the latch 316. Depressing the mechanical release 320 disengages the latch 316 from the locking feature 318 in the recess 314.

In operation, the headset insert 312 is positioned proximate to the frame 302. The protrusion of the second connector 310 is inserted into the recess 314 such that the latch 316 engages with the locking feature 318. This action mechanically secures the headset insert 312 to the frame 302 and electrically couples the electrical contacts (not shown) of the second connector 310 to the electrical contacts 308 of the first connector 304. The headset 300 can then be positioned on the head of a user.

FIG. 3B illustrates a perspective view of the headset insert 312 including the second connector 310 according to one embodiment of the invention. The second connector 310 includes mechanical features 322 and electrical contacts 324 which mate with corresponding mechanical features 306 (FIG. 3A) and electrical contacts 308 (FIG. 3A) of the first connector 304 (FIG. 3A) integrated with the frame 302 of the headset 300.

In one embodiment, the second connector 310 includes the protrusion 326. The protrusion 326 can have a shape which fits into the recess 314 (FIG. 3A) of the first connector 304. The shape of the protrusion 326 is preferably symmetrical along the vertical and horizontal axes to allow the protrusion 326 to fit into the recess 314 in at least two different orientations.

The second connector 310 can also include the mechanical latch 316. The latch 316 engages with a locking feature 318 (FIG. 3A) located in the recess 314 of the first connector 304. The latch 316 is configured to physically secure the second connector 310 to the first connector 304; thereby securing the headset insert 312 to the frame 302 and connecting the electrical contacts 324 of the headset insert 312 to the electrical contacts 308 of the frame 302. The mechanical release 320 decouples the latch 316 from the locking feature 318 to separate the headset insert 312 from the frame 302.

The headset insert 312 can also include one or more audio speakers (not shown). The speakers can be positioned proximate to a user's ears when the headset insert 312 is placed on the user's head.

Figure 4A:
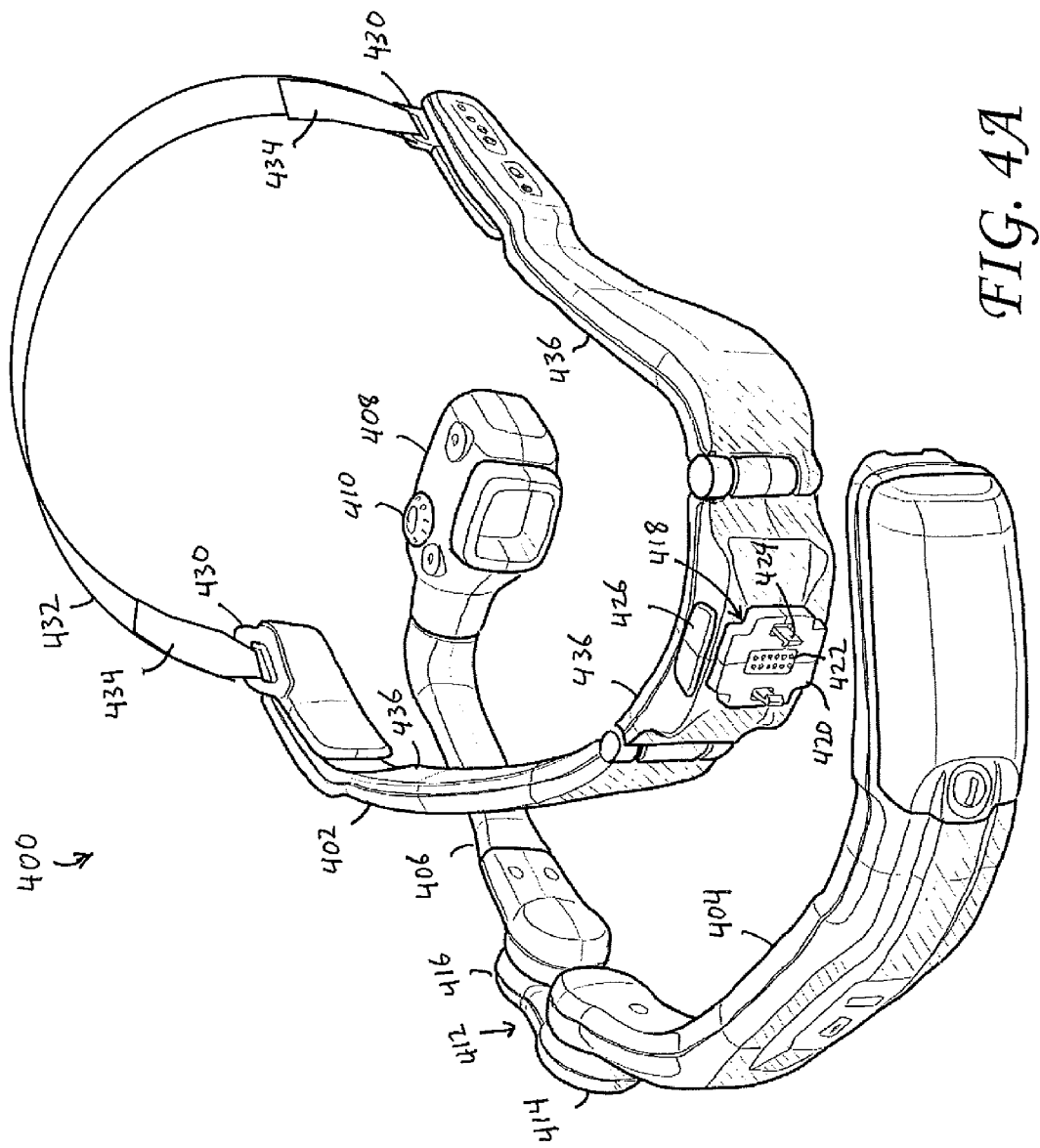

FIG. 4A is a perspective view of a modular headset computer 400 according to one embodiment of the invention. The headset 400 includes a headset insert 402 decoupled from a frame 404 according to one embodiment. The frame 404 includes a boom 406. The boom 406 is positioned on the left side of a user's head when the headset 400 is positioned on the user's head. In an embodiment in which the boom 406 supports the display 408, this configuration is appropriate for a left eye dominant user since the display 408 will be viewed using the user's left eye. The display 408 can be a micro-display. The display 408 can include a control 410 for focusing a lens (not shown) in front of the display 408. The control 410 can be a diopter adjustment, for example.

In one embodiment, the boom 404 includes a joint 412. The joint 412 can include two rotatable couplings 414, 416. The rotatable couplings 414, 416 are adapted to situate the display 408 in various positions. Skilled artisans will appreciate that the boom 404 can include other suitable mechanical couplings.

The headset insert 404 can include a connector 418 having mechanical features 420 and electrical contacts 422. The connector 418 can also include a latching mechanism 424. The latching mechanism 424 is configured to mechanically and electrically secure the connector 418 of the headset insert 402 to a connector (not shown) of the frame 404. The latching mechanism 424 can be coupled to a mechanical release 426 located on the headset insert 402. The mechanical release 426 is adapted to unsecure the latching mechanism 424 from a locking feature (not shown) of the connector on the frame 404.

The headset insert 402 can also include a set of attachment features 430. A band 432 is configured to be worn substantially across the crown of the head of the user. The band 432 can be detachably coupled to the set of attachment features 430 on the headset insert 402.

The band 432 can be fabricated from a flexible material, such as cloth, plastic, rubber or sheet-metal, for example. In practice, any suitable material can be used. In one embodiment, the band 432 is replaceable. The length of band 432 is adjustable using straps 434. The adjustable straps 434 can include Velcro®-type closures to securely fix the length of the band 432. Other suitable techniques can also be used to fix the length of the band 432.

In one embodiment, one or more cushions 436 can be coupled to the headset insert 402. In operation, the back of the user's head contacts the cushions 436. The cushions 436 provide comfort and stability when the user is wearing the headset 400.

Figure 4B:
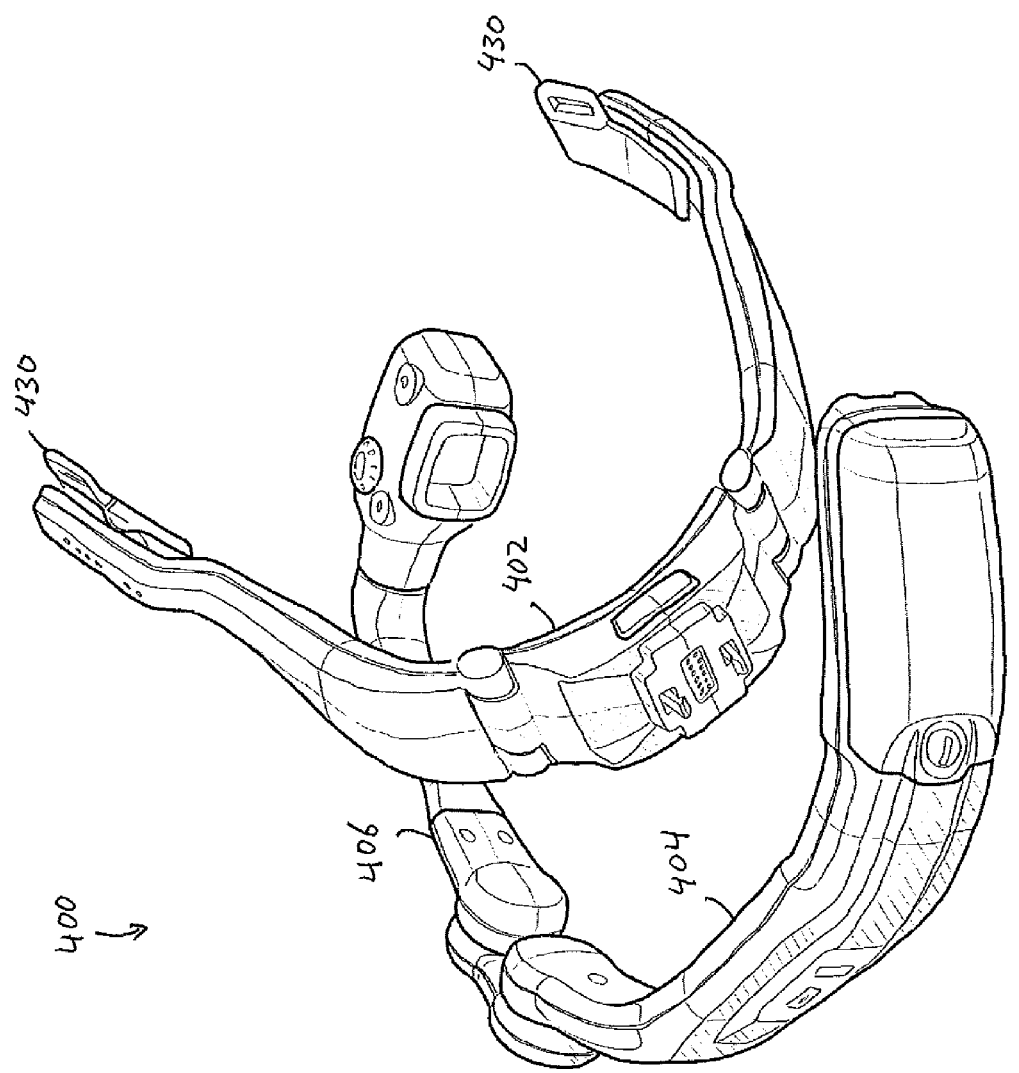

FIG. 4B is another perspective view of the modular headset computer 400 of FIG. 4A. The band 432 can be detachably coupled to the first set of attachment features 430. For illustrative purposes, the band 432 is not shown in FIG. 4B.

The headset insert 402 can be rotated relative to the frame 404 in order to change the orientation of the boom 406 that is attached to the frame 404. For example, the headset insert 402 can be detached from the frame 404 and rotated one hundred and eighty (180) degrees relative to the frame 404.

FIG. 4C is another perspective view of the modular headset computer 400 of FIG. 4A. In this view, the headset insert 402 is rotated one hundred and eighty degrees (180) relative to the frame 404. The attachment features 430 shown in FIG. 4C are now opposite in direction from the same attachment features 430 shown in FIG. 4A.

Figure 4D:
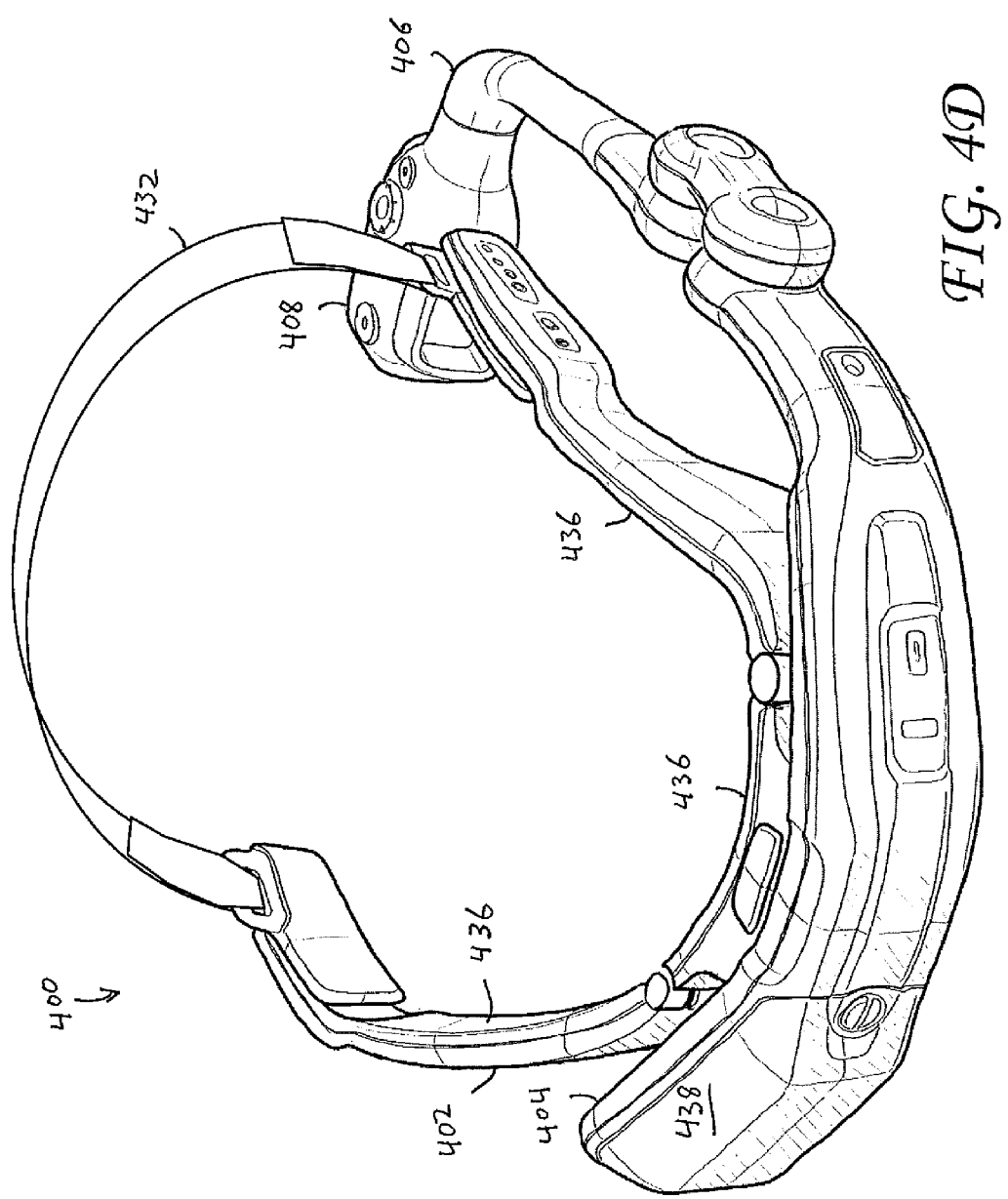

FIG. 4D is another perspective view of the modular headset computer 400 of FIG. 4A. In this view, the headset insert 402 is mechanically coupled to the frame 404. The boom 406 shown in FIG. 4D is now positioned on the opposite side from the boom 406 shown in FIG. 4A. This configuration is appropriate for a right eye dominant user since the display 408 will be viewed using the user's right eye. In the mode of operation shown in FIG. 4A, the boom 406 is located on the left side of the user's face.

In one embodiment, a speaker (not shown) can also be coupled to the frame 404. The speaker can provide audio output to the user. In one embodiment, a camera (not shown) can be coupled to the frame 404 on the side opposite to the boom 406. The camera can be a video camera, for example. In practice, any desired module can be fitted to the frame 404, such as a flashlight, for example.

The frame 404 can also house a battery 438 and a processing module (not shown). The battery 438 can be a rechargeable battery. The processing module can include a microprocessor, memory and any other components required to operate the headset 400. The frame 404 can also include one or more ports or connectors, such as a universal serial bus (USB) port (not shown).

In operation, the user sets the headset insert 402 on the back of the head such that the band 432 is positioned substantially across the crown of the head. The user adjusts the length of the band 432 until the headset insert 402 is located in a comfortable position. One or more cushions 436 can also be coupled to the headset insert 402. The cushions 436 provide comfort and stability to the headset 400. The user then adjusts the boom 406 until the display 408 is located in the appropriate position.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for the near-field wireless device pairing described herein. The non-processor circuits may include, but are not limited to, a radio receiver, a radio transmitter, signal drivers, clock circuits, power source circuits, and user input devices. As such, these functions may be interpreted as steps of a method to perform the near-field wireless device pairing described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A headset computer comprising:
   a headset insert worn on a head of a user, the headset insert comprising a first connector having a first mechanical coupler, the first connector being configured to mate in at least two different orientations with a second connector having a second mechanical coupler; and
   a frame worn on the head of the user, the frame comprising the second connector that mates with the first connector, the frame adapted to receive the headset insert in the at least two different orientations.

2. The headset computer of claim 1, wherein the frame further comprises a memory for storing a software application and a processor for executing the software application.

3. The headset computer of claim 1, wherein the frame further comprises a wireless radio for connection with a wireless network.

4. The headset computer of claim 1, wherein the headset insert further comprises a speaker.

5. The headset computer of claim 1, wherein the headset insert further comprises a cushion.

6. The headset computer of claim 1, wherein mating the first and second mechanical couplers physically secures the headset insert to the frame.

7. The headset computer of claim 1, further comprising a mechanical release for separating the second mechanical coupler from the first mechanical coupler.

8. The headset computer of claim 1, wherein mating the first and second connectors electrically connects a circuit in the headset insert to a circuit in the frame.

9. The headset computer of claim 1, wherein the headset insert is configurable to fit a plurality of heads having different sizes.

10. The headset computer of claim 1, wherein the headset insert further comprises a plurality of mechanical attachment features for attaching a head-strap.

11. The headset computer of claim 1, wherein the frame further comprises a boom for supporting a peripheral.

12. The headset computer of claim 11, wherein the peripheral comprises at least one of a display, a microphone, and a motion sensor.

13. The headset computer of claim 12, wherein the display comprises a micro-display.

14. A headset computer comprising:
    a headset insert worn on a head of a user, the headset insert being configurable to fit a plurality of heads having different sizes, the headset insert comprising a speaker and a first connector having electrical contacts and mechanical coupling features, the first connector being configured to mate in at least two different orientations with a second connector; and
    a frame worn on the head of the user, the frame comprising the second connector that mates with the first connector in the at least two different orientations, the frame comprising a memory for storing a software application and a processor for executing the software application; and
    a boom coupled to the frame for supporting a peripheral, the peripheral comprising a user interface to the software application.

15. The headset computer of claim 14, wherein the peripheral comprises at least one of a display, a microphone and a motion sensor.

16. The headset computer of claim 15, wherein the display comprises a micro-display.

17. The headset computer of claim 14, wherein the frame further comprises a wireless radio for connection with a wireless network.

18. The headset computer of claim 14, wherein the headset insert further comprises a cushion.

19. The headset computer of claim 14, further comprising a mechanical release for separating the second connector from the first connector.

20. The headset computer of claim 14, wherein mating the first and second connectors electrically connects a circuit in the headset insert to a circuit in the frame.

21. The headset computer of claim 14, wherein the headset insert is configurable to fit a plurality of heads having different sizes.

22. The headset computer of claim 14, wherein the headset insert further comprises a plurality of mechanical attachment features for attaching a head-strap.

\* \* \* \* \*